United States Patent
Kim et al.

(10) Patent No.: US 10,969,785 B2
(45) Date of Patent: Apr. 6, 2021

(54) AUTOMATED VEHICLE OPERATION TO COMPENSATE FOR SENSOR FIELD-OF-VIEW LIMITATIONS

(71) Applicant: Motional AD LLC, Boston, MA (US)

(72) Inventors: Junsung Kim, Pittsburgh, PA (US);
Wenda Xu, Pittsburgh, PA (US);
Junqing Wei, Bridgeville, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 15/658,065

(22) Filed: Jul. 24, 2017

(65) Prior Publication Data
US 2019/0025833 A1    Jan. 24, 2019

(51) Int. Cl.
*G05D 1/00* (2006.01)
*G05D 1/02* (2020.01)
(Continued)

(52) U.S. Cl.
CPC ......... *G05D 1/0094* (2013.01); *B62D 15/025* (2013.01); *G01S 13/42* (2013.01);
(Continued)

(58) Field of Classification Search
CPC combination set(s) only.
See application file for complete search history.

(56) References Cited

U.S. PATENT DOCUMENTS 5,926,114 A * 7/1999 Andrews ................ G08G 1/164
                                                        180/167
9,357,208 B2 * 5/2016 Gupta ..................... H04N 17/00
(Continued)

FOREIGN PATENT DOCUMENTS

DE    102015016057    6/2016
WO    WO2017023427    2/2017

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

(Continued)

*Primary Examiner* — Alex C Dunn
(74) *Attorney, Agent, or Firm* — Fish & Richardson P.C.

(57) ABSTRACT

An operating system for an automated vehicle equipped with limited field-of-view sensors is provided. The system includes an object-detector and a controller. The object-detector detects objects proximate to a host-vehicle. A field-of-view of the object-detector is characterized by a preferred-portion of the field-of-view, where the preferred-portion is characterized as preferred for using the object-detector. The controller is in communication with the object-detector. The controller steers the host-vehicle to align the preferred-portion with a detected-object. The system optionally includes an intersecting-road-indicator that indicates an intersecting-road connected to an intersection approached by the host-vehicle, and the controller is in communication with the intersecting-road-indicator. The controller designates an intersecting-road as the detected-object, and steers the host-vehicle to align the preferred-portion of the object-detector with the intersecting-road when the host-vehicle approaches the intersection.

19 Claims, 2 Drawing Sheets

(51) Int. Cl.
  *B62D 15/02* (2006.01)
  *G01S 13/931* (2020.01)
  *G01S 17/42* (2006.01)
  *G01S 13/86* (2006.01)
  *G01S 13/42* (2006.01)
  *G01S 17/931* (2020.01)

(52) U.S. Cl.
  CPC .......... *G01S 13/867* (2013.01); *G01S 13/931* (2013.01); *G01S 17/42* (2013.01); *G01S 17/931* (2020.01); *G05D 1/024* (2013.01); *G05D 1/0246* (2013.01); *G05D 1/0257* (2013.01); *G05D 1/0274* (2013.01); *G01S 2013/9323* (2020.01); *G05D 2201/0213* (2013.01)

(56) References Cited

U.S. PATENT DOCUMENTS

| | | | |
|---|---|---|---|
| 9,460,613 B1* | 10/2016 | Whiting | G08G 1/005 |
| 9,719,801 B1* | 8/2017 | Ferguson | G01C 25/00 |
| 2008/0300733 A1* | 12/2008 | Rasshofer | G01S 13/931 |
| | | | 701/1 |
| 2011/0025529 A1* | 2/2011 | Uechi | G08G 1/096783 |
| | | | 340/905 |
| 2015/0002329 A1* | 1/2015 | Murad | G01S 13/931 |
| | | | 342/155 |
| 2017/0050671 A1* | 2/2017 | Bajpai | B62D 15/025 |
| 2017/0108863 A1* | 4/2017 | Chundrlik, Jr. | B60W 50/0205 |
| 2018/0050664 A1* | 2/2018 | Tarte | B60R 25/31 |
| 2018/0059236 A1* | 3/2018 | Wodrich | G01S 13/867 |
| 2018/0074493 A1* | 3/2018 | Prokhorov | G08G 1/096811 |
| 2018/0101737 A1* | 4/2018 | You | H04N 13/239 |
| 2018/0203124 A1* | 7/2018 | Izzat | G01S 17/42 |
| 2018/0253099 A1* | 9/2018 | Jacobus | G05D 1/024 |
| 2018/0261095 A1* | 9/2018 | Qiu | G08G 1/164 |
| 2018/0373260 A1* | 12/2018 | Lipson | G05D 1/024 |
| 2019/0025849 A1* | 1/2019 | Dean | G03B 37/02 |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

European Extended Search Report in European Application No. 18184892.0, dated Dec. 20, 2018, 9 pages.

* cited by examiner

AUTOMATED VEHICLE OPERATION TO COMPENSATE FOR SENSOR FIELD-OF-VIEW LIMITATIONS

TECHNICAL FIELD OF INVENTION

This disclosure generally relates to an operating system for an automated vehicle equipped with limited field-of-view sensors, and more particularly relates to a system that steers a host-vehicle to align a preferred-portion of a field-of-view of an object-detector with a detected-object.

BACKGROUND OF INVENTION

It is known to equip an automated vehicle with an object-detector to detect objects proximate to the automated vehicle. However, most examples of object-detectors (e.g. camera, radar, or lidar) are not omnidirectional, but have a preferred direction of use and are fixedly attached to a host-vehicle. As a result, the range and/or sensitivity of object detection may be better in some directions based on the mounting orientation of the object detector with respect to the automated vehicle. For example, a side-view radar may be better able to detect objects located at +/−90° of angle relative to the forward-direction of travel of the host-vehicle, when compared to other-directions, e.g. +/−45° of angle relative to the forward-direction of travel of the host-vehicle.

SUMMARY OF THE INVENTION

In accordance with one embodiment, an operating system for an automated vehicle equipped with limited field-of-view sensors is provided. The system includes an object-detector and a controller. The object-detector detects objects proximate to a host-vehicle. A field-of-view of the object-detector is characterized by a preferred-portion of the field-of-view, where the preferred-portion is characterized as preferred for using the object-detector. The controller is in communication with the object-detector. The controller steers the host-vehicle to align the preferred-portion with a detected-object.

In another embodiment, the system includes an intersecting-road-indicator that indicates an intersecting-road connected to an intersection approached by the host-vehicle. The controller is in communication with the intersecting-road-indicator. The controller designates an intersecting-road as the detected-object, and steers the host-vehicle to align the preferred-portion of the object-detector with the intersecting-road when the host-vehicle approaches the intersection.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
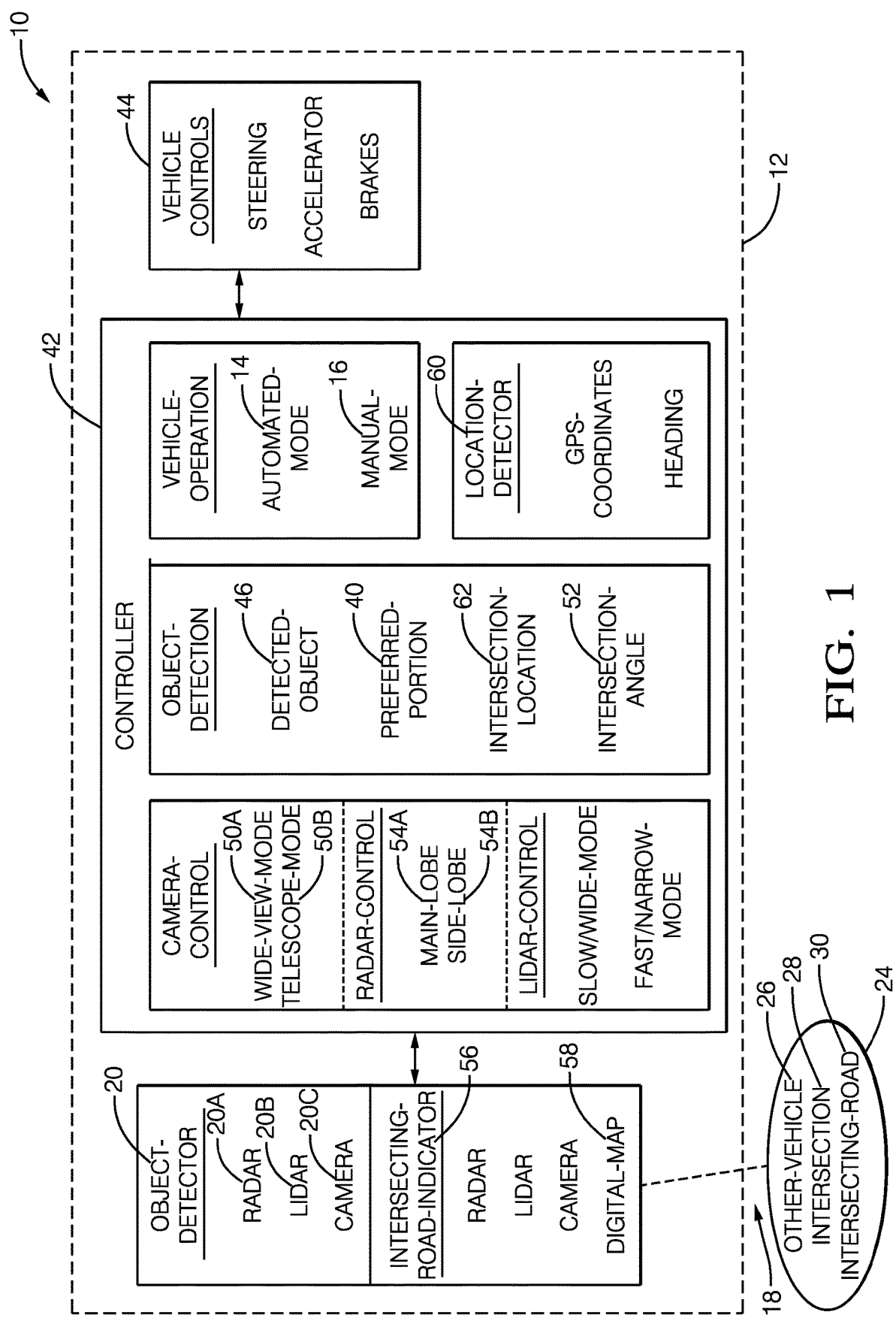
FIG. 1 is operating system for an automated vehicle in accordance with one embodiment.

FIG. 1 illustrates a non-limiting example of an operating system 10, hereafter referred to as the system 10, which is suitable for use on an automated vehicle, e.g. host-vehicle 12. As will become apparent in the description that follows, the system 10 overcomes the aforementioned problem of detecting objects when the host-vehicle 12 is equipped with limited field-of-view sensors, e.g. an object-detector 20 such as a radar 20A, a lidar 20B, a camera 20C, or any combination thereof. The aforementioned problem is generally due to the object-detector 20 being fixedly attached to the host-vehicle 12. That is, no means is provided to change the base direction or boresight of the field-of-view 18 of the object-detector 20 with respect to a forward-direction 22 (FIG. 2) of travel of the host-vehicle 12.

It is recognized that the problem could be overcome by attaching the object-detector 20 to the host-vehicle 12 with an adjustable aiming means that could vary the orientation of the object-detector 20 with respect to the host-vehicle 12. However, this solution adds undesirable expense and complication with regard to operating the aiming means and keeping track of the aiming direction of the sensor being aimed. The system 10 described herein overcomes the aforementioned problem by steering the host-vehicle 12 so the object-detector 20 is better aimed at an object 24 being identified tracked, classified, or otherwise detected.

As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator in certain circumstances to steer the host-vehicle 12 to better aim the object-detector 20 at the object 24. The object-detector 20 is generally configured to detect objects such as, but not limited to, an other vehicle 26, an intersection 28 being approached by the host-vehicle 12 and/or an intersecting-road 30 that intersects with a travel-road 32 (FIG. 2) presently traveled by or proximate to the host-vehicle 12.

Figure 2:
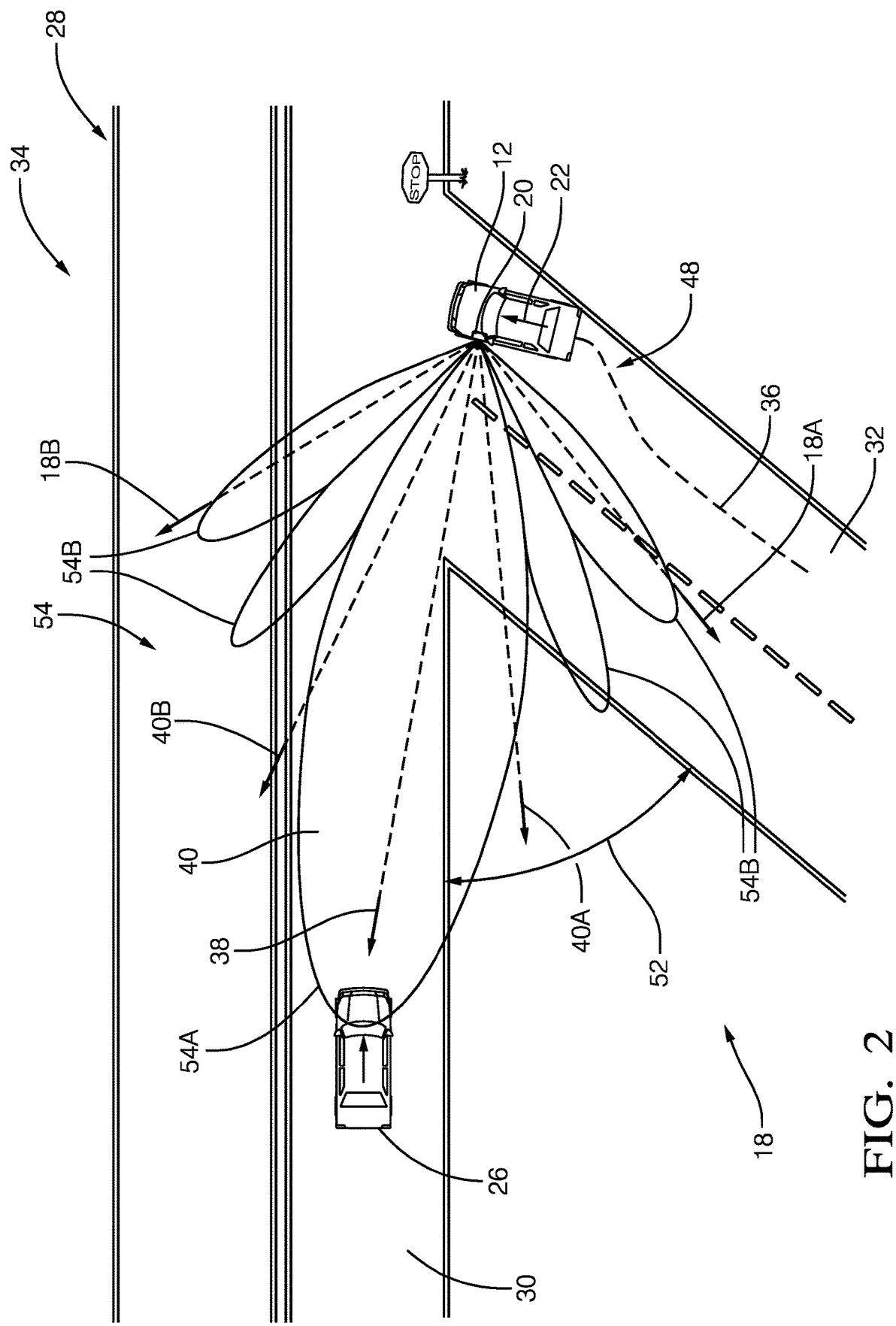
FIG. 2 is a traffic-scenario encountered by the system of FIG. 1 in accordance with one embodiment.

FIG. 2 illustrates a non-limiting example of a traffic-scenario 34 that the host-vehicle 12, equipped with the system 10 described herein, may encounter. The host-vehicle 12 is illustrated as having followed a travel-path 36 along the travel-road as the host-vehicle 12 approached the intersection 28. The reason for the swerve-maneuver 48 in the travel-path 36 just prior to reaching the intersection 28 will be described later. In this non-limiting example the field-of-view 18 is the area between arrow 18A and arrow 18B, and is generally centered about a boresight 38 of the object-detector 20. The field-of-view 18 of the object-detector 20 is characterized by or defines a preferred-portion 40 of the field-of-view 18 that in this example is an area defined or bounded between arrow 40A and arrow 40B. As used herein, the preferred-portion 40 is an area that is narrower than, and entirely within, the extents of the field-of-view 18. In other words, the preferred-portion 40 is a subset of the field-of-view 18. Furthermore, the preferred-portion 40 is characterized as preferred for using the object-detector 20 to identify, track, monitor, classify, or otherwise detect an instance of the object 24, which could be, but is not limited to, the intersection 28, the intersecting-road 30, and/or the other-vehicle 26. The preferred-portion 40 may be selected based on some performance characteristic such as, but not limited to, sensitivity, resolution, and/or detection range being better within the preferred-portion 40 when compared to the area within the field-of-view 18 but outside of the preferred-portion 40.

Continuing to refer to FIGS. 1 and 2, the system 10 includes a controller 42 in communication with the object-detector 20. The controller 42 may include a processor (not specifically shown) such as a microprocessor or other control circuitry such as analog and/or digital control circuitry including an application specific integrated circuit (ASIC) for processing data as should be evident to those in the art. The controller 42 may include memory (not specifically shown), including non-volatile memory, such as electrically erasable programmable read-only memory (EEPROM) for storing one or more routines, thresholds, and captured data. The one or more routines may be executed by the processor to perform steps for determining a presence of and/or distance/direction to the object 24 based on signals received by the controller 42 from the object-detector 20 as described herein. The controller 42 may be configured to operate (e.g. steer, accelerate, brake) the host-vehicle 12 by way of vehicle-controls 44. Those in the automated vehicle arts will recognize that there are many known ways for the controller 42 to be configured or adapted to operate the host-vehicle 12 via the vehicle-controls 44, so the details of that arrangement will not be discussed in this document.

However, it is pointed out that the controller 42 is configured or adapted to steer the host-vehicle 12 to align the preferred-portion 40 with a detected-object 46, e.g. a particular instance of the object 24 such as the intersection 28, the intersecting-road 30, and/or the other-vehicle 26. As shown in FIG. 2, the travel-road 32 and the intersecting-road 30 intersect at an angle other than the typical right-angle of many or most intersections. However, because of the intersection-angle 52 in this example, the preferred-portion 40 of the object-detector 20 may not be well aimed toward where an approaching-vehicle (e.g. the other-vehicle) on the intersecting-road 30 may be located if the host-vehicle 12 merely stops with the forward-direction 22 oriented parallel to the travel-road 32 (being parallel is not what is shown in FIG. 2). Accordingly, the controller 42 may be advantageously configured to steer the host-vehicle 12 to align the preferred-portion 40 with the detected-object 46, e.g. a particular instance of the intersection 28, the intersecting-road 30, and/or the other-vehicle 26. As suggested above, depending on the configuration of the intersection 28, the steering of the host-vehicle 12 to align the preferred-portion 40 with the detected-object 46 may include a swerve-maneuver 48 to better situate the orientation of the host-vehicle 12 at the intersection 28 to align the preferred-portion 40 of the object-detector 20 with the detected-object 46.

By way of example and not limitation, the object-detector 20 may consist only of, or may include along with other devices, the camera 20C. The camera 20C may be operable to a wide-view-mode 50A (which may include operating at a relatively high-resolution) that views all or the entirety of the field-of-view 18, and a telescope-mode 50B (which may include operating at a relatively low-resolution due to viewing a specified or limited region of interest) that views only the preferred-portion 40 of the field-of-view 18. The controller 42 may operate the camera 20C in the wide-view-mode 50A until the object 24 is detected (which then becomes or is designated by the system 10 as the detected-object 46), and then steer the host-vehicle 12 (if/when possible) so the object 24 (i.e. the detected-object 46) is within the preferred-portion 40 before switching to the telescope-mode 50B. For example, if the detected-object 46 is the intersecting-road 30 connected to the intersection 28 approached by the host-vehicle 12, and the controller 42 steers the host-vehicle 12 to align the preferred-portion 40 of the camera 20C with the intersecting-road 30, then the camera 20C may be operated to the telescope-mode 50B so that an instance of the other-vehicle 26 (if an instance is present) can be more readily detected/classified/tracked by the camera 20C.

As another example, the object-detector 20 may consist only of, or may include along with other devices, the radar 20A. The field-of-view 18 of the radar 20A may be characterized by a sensitivity-pattern 54 that defines side-lobes 54B and a main-lobe 54A. By way of further example, the detected-object 46 may be the other-vehicle 26 approaching the host-vehicle 12 by traveling on the intersecting-road 30 that intersects the travel-road 32 of the host-vehicle 12 at the intersection 28. Accordingly, the controller 42 may steer the host-vehicle 12 to align the main-lobe 54A of the radar 20A with the other-vehicle 26. It is contemplated that the radar 20A may be operable to a low-frame-rate/wide-mode and high-frame-rate/narrow-mode similar to the how the camera 20C is operable to the wide-view-mode 50A and the telescope-mode 50B.

In the above examples, the same sensor (the radar 20A or the camera 20C) that is used to initially detect the detected-object 46 is also redirected by steering the host-vehicle 12 so the detected-object 46 is with the preferred-portion 40. It is also contemplated that two distinct or different sensors can be used cooperatively or synergistically for this two-step process. For example, the system 10 may include, in addition to the object-detector 20, an intersecting-road-indicator 56 that indicates the presence of the intersecting-road 30 connected to the intersection 28 that is being approached by the host-vehicle 12. The intersecting-road-indicator 56 may be a radar, a lidar, a camera, a digital-map 58, or any combination thereof. While FIG. 1 may be interpreted to suggest that the object-detector 20 and the intersection-road-indicator 56 each have, for example, a dedicated instance of a camera, this is not a requirement. That is, the camera 20C shown as part of the object-detector 20 and the camera (no reference number) shown as part of the intersecting-road-indicator 56 may be the same camera that is shared by the object-detector 22 and the intersecting-road-indicator 56.

It follows that the controller 42 is also in communication with the intersecting-road-indicator 56. The controller 42 may designate the intersecting-road 30 as the detected-object 46, and steer the host-vehicle 12 to align the preferred-portion 40 of the object-detector 20 with the intersecting-road 30 when the host-vehicle 12 approaches the intersection 28.

As suggested above, in a non-limiting example of the system 10 the intersecting-road-indicator 56 may be is a digital-map 58 such as those used on known navigation devices to plan a route to a destination for the host-vehicle 12 to travel. In order for the system 10 to determine where on the digital-map 58 the host-vehicle 12 is located, the system 10 may include a location-detector 60 such as a global-positioning-system (GPS) receiver that provides GPS-coordinates and/or a heading (direction of travel on a compass) of the host-vehicle 12. The digital-map 58 may indicate an intersection-location 62 of the intersection 28 and/or information regarding the intersection-angle 52 of the travel-road 32 with the intersecting-road 30. The information from the digital-map 58 may be used to determine how to steer the host-vehicle 12 at the intersection 28 so the preferred-portion 40 of the object-detector 20 is better aligned with the intersecting-road 30 so the other-vehicle 26 (if present) can be more readily or reliably detected.

In another non-limiting embodiment the object-detector 20 may be the lidar 20B, and the controller 42 steers the host-vehicle 12 to align the field-of-view of the lidar with the intersecting-road 30. If the lidar is used as both the object-detector 20 and the intersecting-road-indicator 56, it is contemplated that the lidar may be operable to a slow/wide mode where a slower frame is used but all of the field-of-view 18 of the lidar is scanned, and operable to a fast/narrow-mode where the preferred-portion 40 of the field-of-view is scanned, but an increased frame-rate is possible.

In another non-limiting example of the system 10, the intersecting-road-indicator 56 may be the camera (optionally the camera 20C), and the object-detector 20 may be the radar 20A. As previously noted, the field-of-view 18 of the radar 20A may be characterized by the sensitivity-pattern 54 that defines the side-lobes 54B and the main-lobe 54A. The controller may then steer the host-vehicle 12 to align the main-lobe 54A of the radar 20A with the intersecting-road 30 based on the detection of the intersecting-road 30 and/or the intersection 28 by the camera. For example, information from the camera may be used to determine the intersection-angle 52, and the controller 42 may determine the shape of the swerve-maneuver 48 necessary to align the preferred-portion 40 with a detected-object 46.

Accordingly, an operating system (the system 10), a controller 42 for the system 10, and a method of operating the system 10 is provided. The system 10 steers the host-vehicle 12 so that a sensor that is being used as the object-detector 20 is better aligned with an instance of the detected-object 46, where the instance may be, for example, the other-vehicle 26, the intersection 28, or the intersecting-road 30.

While this invention has been described in terms of the preferred embodiments thereof, it is not intended to be so limited, but rather only to the extent set forth in the claims that follow.

We claim:

1. A system for a host-vehicle, comprising:
    a location-detector that provides a location of the host-vehicle;
    an object-detector that detects objects proximate to the host-vehicle at the location of the host-vehicle, wherein a field-of-view of the object-detector is characterized by a preferred-portion of the field-of-view that is less than a full field-of-view of the object-detector, wherein the object-detector comprises a camera operable to a wide-view-mode that views all of the field-of-view and a telescope-mode that views only the preferred-portion of the field-of-view, wherein the preferred portion is a subset of the field-of-view and has a performance characteristic that is better than an area within the field-of-view but outside the preferred portion; and
    a controller in communication with the object-detector, wherein the controller steers the host-vehicle to align the preferred-portion of the field-of-view with one or more detected-objects according to the location of the host-vehicle and a location of the one or more detected-objects, wherein a first object of the one or more detected-objects is a first intersecting-road connected to an intersection approached by the host-vehicle, wherein the controller steers the host-vehicle to align the preferred-portion of the camera with the intersecting-road.

2. The system in accordance with claim 1, wherein the object-detector comprises a radar, the field-of-view of the radar is characterized by a sensitivity-pattern that defines side-lobes and a main-lobe, a second object of the one or more detected-objects is an other-vehicle approaching the host-vehicle on a second intersecting-road that intersects a travel-road of the host-vehicle, and the controller steers the host-vehicle to align the main-lobe of the radar with the other-vehicle.

3. The system in accordance with claim 1, wherein the system includes an intersecting-road-indicator that indicates the first intersecting-road, and
    the controller is in communication with the intersecting-road-indicator, said controller designates the first intersecting-road as the first object, and steers the host-vehicle to align the preferred-portion of the object-detector with the first intersecting-road when the host-vehicle approaches the intersection.

4. The system in accordance with claim 3, wherein the intersecting-road-indicator is a digital-map.

5. The system in accordance with claim 3, wherein the object-detector comprises a lidar, and the controller steers the host-vehicle to align the field-of-view of the lidar with the intersecting-road.

6. The system in accordance with claim 3, wherein the intersecting-road-indicator comprises the camera, the object-detector comprises a radar, the field-of-view of the radar is characterized by a sensitivity-pattern that defines side-lobes and a main-lobe, and the controller steers the host-vehicle to align the main-lobe of the radar with the intersecting-road.

7. The system of claim 1, wherein the object-detector is a camera operable to a wide-view mode that views all of the field-of-view and a telescopic mode that views the preferred-portion of the field-of-view, and wherein the controller is configured to steer the host-vehicle to align the preferred portion of the camera with the intersecting-road,
    and wherein the controller is configured to:
        operate the camera in the wide-view mode until the first object is detected;
        steer the host-vehicle to align the preferred portion of the camera with the intersecting-road; and
        switch the camera to the telescopic mode.

8. The system of claim 1, wherein the performance characteristic is one of sensitivity, resolution, or detection range of the object-detector.

9. The system of claim 1, further comprising:
    an intersecting-road-indicator that indicates a location of the intersection and information regarding an angle between a travel road of the host-vehicle and the intersecting-road; and
    wherein the controller is in communication with the intersecting-road-indicator and is configured to use the information indicated by the intersecting-road-indicator to determine a shape of a maneuver for steering the host-vehicle to align the preferred-portion of the object-detector with the intersecting-road.

10. The system of claim 9, wherein the intersecting-road-indicator is a digital map.

11. The system of claim 9, wherein the object-detector is a radar, the intersecting-road-indicator is a camera, the field-of-view of the radar is characterized by a sensitivity pattern that defines a main lobe and a plurality of side lobes, and wherein the controller is configured to steer the host-vehicle to align the main lobe of the radar with the intersecting-road.

12. The system of claim 9, wherein the object-detector is a lidar, and wherein the controller is configured to steer the host-vehicle to align the field-of-view of the lidar with the intersecting-road, wherein the lidar is used as the intersecting-road-indicator.

13. The system of claim 12, wherein the lidar is operable to a slow and wide mode when the field-of-view of the lidar is scanned and is operable to a fast and narrow mode when the preferred portion of the field-of-view of the lidar is scanned.

14. A method comprising:
  detecting, using an object-detector, an object proximate to a host-vehicle, wherein a field-of-view of the object-detector is characterized by a preferred-portion of the field-of-view that is less than a full field-of-view of the object-detector, wherein the object-detector comprises a camera operable to a wide-view mode that views all of the field-of-view and a telescope mode that views the preferred-portion of the field-of-view;
  determining, using a location-detector, a location of the host-vehicle; and
  steering, using a controller in communication with the object-detector, the host-vehicle to align the preferred-portion with one or more detected-objects according to the location of the host-vehicle and a location of the one or more detected-objects, wherein the controller is configured to steer the host-vehicle to align the preferred portion of the camera with an intersecting-road, wherein the controller is configured to:
    operate the camera in the wide-view mode until a first object of the one or more detected-objects is detected;
    steer the host-vehicle to align the preferred portion of the camera with the intersecting-road; and
    switch the camera to the telescope mode.

15. The method in accordance with claim 14, wherein the camera in the telescope-mode views only the preferred-portion of the field-of-view, the first object is the intersecting-road, and the intersecting-road is connected to an intersection approached by the host-vehicle.

16. The method in accordance with claim 14, wherein the object-detector comprises a radar, the field-of-view of the radar is characterized by a sensitivity-pattern that defines side-lobes and a main-lobe, a second object of the one or more detected-objects is an other-vehicle approaching the host-vehicle on an intersecting-road that intersects a travel-road of the host-vehicle, and the controller steers the host-vehicle to align the main-lobe of the radar with the other-vehicle.

17. The method in accordance with claim 14, further comprising:
  designating, using the controller, the intersecting-road as the first object; and
  steering the host-vehicle to align the preferred-portion of the object-detector with the intersecting-road when the host-vehicle approaches an intersection connected to the intersecting-road.

18. The system of claim 1, wherein a direction of a boresight of a field-of-view of the object-detector is fixed with respect to a forward-direction of travel of the host-vehicle.

19. The method of claim 14, wherein a direction of a boresight of a field-of-view of the object-detector is fixed with respect to a forward-direction of travel of the host-vehicle.

* * * * *